June 20, 1967

P. SLAVIN 3,327,100

LOGARITHMIC COMPUTER

Filed Nov. 7, 1963

INVENTOR
PETER SLAVIN

INVENTOR
PETER SLAVIN

June 20, 1967  P. SLAVIN  3,327,100
LOGARITHMIC COMPUTER
Filed Nov. 7, 1963  3 Sheets-Sheet 3

INVENTOR
PETER SLAVIN

United States Patent Office 3,327,100
Patented June 20, 1967

3,327,100
LOGARITHMIC COMPUTER
Peter Slavin, Winchester, Mass., assignor to Intelligent Instruments, Inc., Woburn, Mass., a corporation of Massachusetts
Filed Nov. 7, 1963, Ser. No. 322,209
4 Claims. (Cl. 235—150.53)

This invention relates to the field of analog and digital computers. It describes circuits and logical techniques for generating logarithms and/or exponentials of input quantities (electrical signals). These signals may be expressed in analog or digital form, and the translation means itself is a mixture of both digital and analog circuits—i.e. it is a sort of simple hybrid computer.

There are two broad fields in which such a device is useful. First, in the conversion of transducer logarithmic responses into linear responses. Many transducers, when measuring some quantity of their input, yield a voltage or current at their output that is proportional to the logarithm of the input quantity. While there exist measures for dealing with this characteristic, such as meters marked with logarithmic scales, it is frequently desirable for convenience and accuracy to convert such logarithmic responses to a linear response. Conversely, a linear response may be converted to a logarithmic response, when it is desirable for reasons, such as compressing the sensitivity at the upper end of the range.

The second field to which this invention relates is that of computing. Present means for taking the logarithm and the exponential of a quantity are either slow or costly or have a limited storage of the results. An example of the computing application would be the multiplying of two quantities; thus, adding together their logarithms, and then taking the exponential of this total. These quantities may be expressed in analog form such as a voltage or a time interval, or they may be expressed in a digital form such as a frequency or a number stored in a counter. The number may be coded in any convenient manner (binary, decimal, etc.), since the operation in no way depends upon this coding.

Accordingly it is an objective of the present invention to provide a means for converting a time interval into a number stored in a counter, where that number is exponentially related to that interval.

Another object of this invention is to provide means for making a pulse rate (frequency) which is exponentially related to an interval of time. That rate is stable for an indefinite period, until released.

Still another objective is to provide a system in which a number can be matched against the total in a counter; and, when the two are equal, then the counting interval (from zero) represents a logarithm of the number.

One further object of this invention is to provide a system in which well known electronic means can be used so that the time interval mentioned above may be expressed as a frequency or a voltage. As an illustration, we will show how numbers may be multiplied or divided, and the result expressed in the same digital code.

Figure 5:
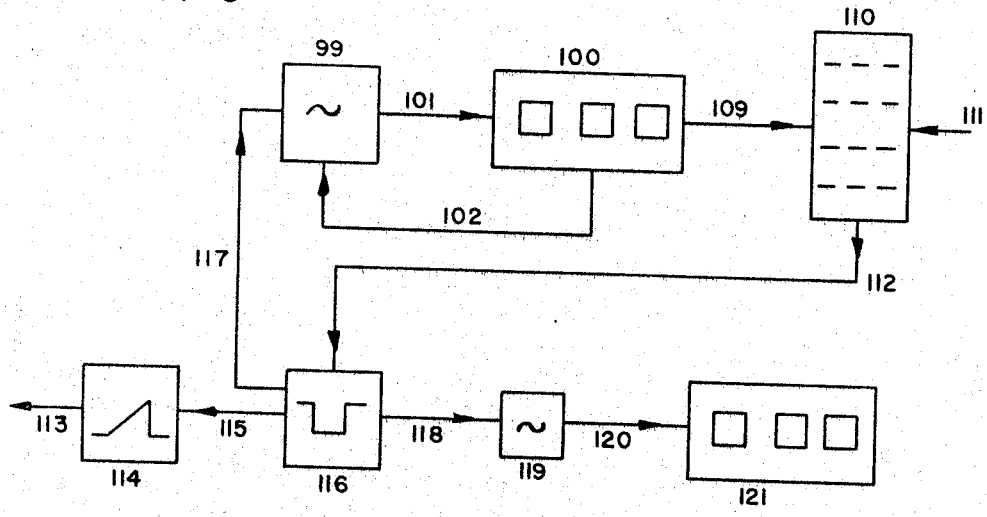

FIGURE 5 gives the arrangement of circuits for converting a (digital) number into the logarithm of that number—the said logarithm appearing in several forms.

Figure 6:
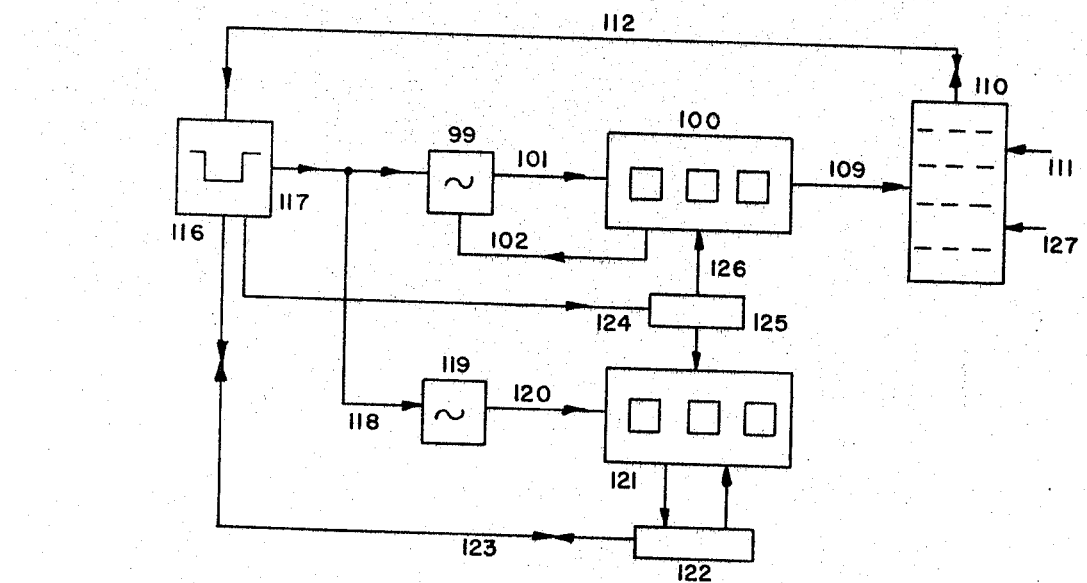

FIGURE 6 is a block diagram in which the parts are organized so as to multiply or divide two or more input numbers.

Reference is now made to the drawings in order to explain in detail the action of the circuits and the logic.

Figure 1:
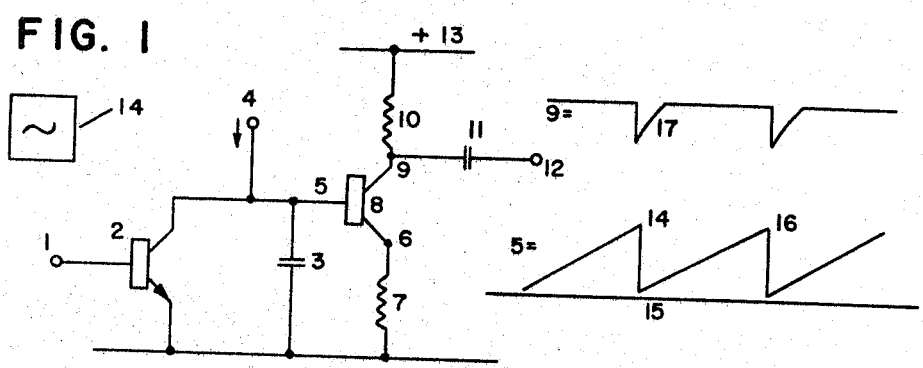
FIGURE 1 is a circuit diagram of one type of pulse generator in which the rate can be controlled by a current input.

In FIGURE 1 there is shown a very simple form of relaxation oscillator whose output frequency (pulse rate) is proportional to the total controlling current applied. The essential element here is a double-based device 8 (a General Electric 2N490 unijunction transistor). This device has the property that, when terminal 5 is more positive than a potential intermediate between the potentials on bases 6 and 9, there will exist a very low resistance path between terminal 5 (the emitter) and terminal 6 (the lower base). Device 2 is a transistor which gives a short circuit across the capacity 3 when the base 1 is more positive than ground. When the base is more negative than ground, there is an open circuit between part 14 and ground. The action of this circuit is as follows:

The potential on the terminal 5 is very close to ground as the transistor has its input 1 positive and is conducting. Under these conditions the unijunction 8 gives a high resistance between terminals 9 and 6. Therefore very small current flows from positive voltage 13 to the ground via components 10, 8 and 7. At the start of the time interval the voltage of terminal 1 is moved negative, and the current coming in at terminal 4 begins to charge the capacity 3 rather than flow to the ground via 2. This charging current causes the voltage on 3 to raise in a linear fashion until the voltage at 5 approximates the critical voltage at which the device 8 "breaks down." This critical voltage is shown in the time plot as 14. At this instant there will be a rapid discharge of the capacity 3 via the terminals 5 and 6 and the resistance 7; at the same time, terminal 9 will be connected to a much lower resistance to ground than was the case before this "breakdown." This will cause a rapid increase in current in resistance 10, giving a negative voltage pulse which is shown in time plot as 17. As soon as the capacity 3 has discharged, the high resistance between terminals 5, 6 and 9 and 6 returns, and capacity 3 once more begins to charge with the current at 4. The voltage on capacity 3 just after this "breakdown" is very close to ground, as shown by 15.

It is apparent that an increase of current at 4 will charge the capacity 3 in a smaller time. This time is called the pulse period and is inversely proportional to the current at 4, so that the frequency must be directly proportional to this current. At the end of the time interval, the voltage at terminal 1 is moved positive, the charging current is diverted to ground, and there are no further negative pulses out at 12.

Figure 2A:
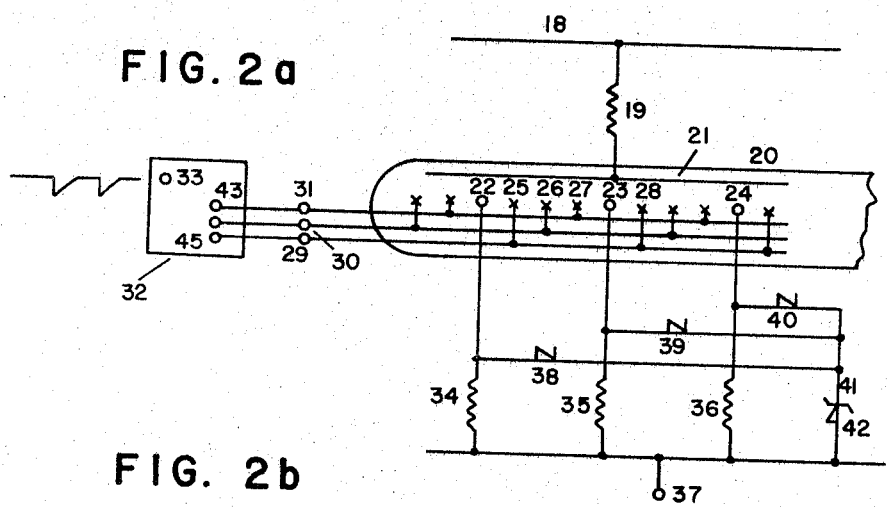
FIGURES 2a and 2b show one convenient counting device in circuit form. They also give the trigger sequence of one count, and an end view of the counting tube.
Figure 2B:
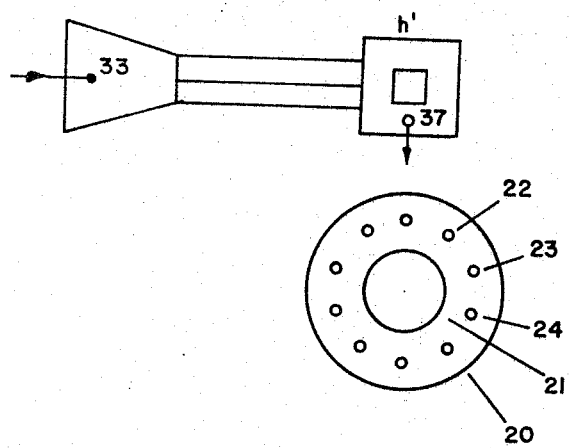

Referring now to FIGURE 2, there is given part of the circuit of a suitable counter stage. This stage will count to ten; that is, for each trigger pulse in at 33 the electrical signal (current) will move from one output terminal to a succeeding terminal. There are ten such terminals, and only one has this current at any given instant.

The counting action is achieved in this example by a cold cathode counting tube, such as the GS10K. Such a tube has one anode, ten cathodes, and three sets of transfer electrodes. Other tubes, such as the GS10C (with two sets of transfers), or other circuits (e.g. straight binary) may be employed with similar results.

The tube 20 is shown with anode 21 and a part of its ring of transfer and cathode pins (cathodes 22, 23, 24, and transfers 25, 26, 27). Let us assume that initially there is a current from positive voltage 18 via resistor 19, anode 21, cathode 22, resistor 34, and out at terminal 37. Then a negative pulse, a "trigger," arrives at terminal 33, which is the input to the drive circuit for the counting tube. This drive circuit 32 may be one of a number of designs, as given in the tube manufacturers' manual (Ericsson Limited of Beeston, Nottinghamshire, England), or it may be a blocking oscillator type as designed by the inventor.

The drive circuit will "trigger" and give three large negative pulses staggered in time to transfer terminals 29, 30 and 31 respectively. Thus 29 will go from a positive "bias" of 45 volts to a negative level (approximately negative 100 v.) for a few microseconds. As it returns positive, terminal 30 will still be negative—its pulse being wider (approximately 20 $\mu s$.). As 30 then returns positive towards the 45 volt bias 31 will be going negative. Finally, after about 35 $\mu s$., transfer terminal 31 will return to bias.

There is a "ring" of ten cathodes, with three transfer pins, between adjacent cathodes. Then the terminals 31, 30 and 29 going negative in sequence causes corresponding transfers 25, 26 and 27 to do likewise. Thus the current, which originally rested on cathode 22 (i.e. "glow") goes to the most negative potential and therefore moves along the pins 25, 26 and 27. When transfer 27 reverts to a positive bias, this current goes to cathode 23, since this cathode will be more negative than the bias.

On the next trigger the current ("glow") at first goes to transfer 28, and the sequence repeats until it rests on next cathode 24. Each transfer terminal 29, 30 and 31 is connected to ten transfer pins, viz 29 to 25, 28, etc., so that the action is identical for any one of ten possible cathode moves. Further, it can be seen that, by interchanging the connections so that 43 goes to 29 and 45 to 31, the sequence is reversed and the current will move in the "reverse" direction (viz cathode 23 to 22).

The current on any cathode (say 22) divides between a resistor (34) and a diode (38) going to terminal 41 on top of a zener or zeners 42. Because of this diode (38) clamp, the voltage on cathode 22 is accurately defined, and independent of voltage 18 and voltage drop from anode 21 to the cathode. Then, since the voltage at 37 is small and the resistor 34 is exact, the current out at terminal 37 from that cathode is exactly set. This current may be made to vary directly (or inversely if useful) to the count by making resistance (34, 35, 36, etc.) inversely proportional to that count. Thus, if current on 22 represents 2 units of count, and on 23 (at another time) 3 units, then resistor 34 will be ⅔ larger than resistor 35, so that a lower number (less count) gives less current out at 37.

The physical construction of the tube is also shown (FIGURE 2b), where it can be seen that the ten cathodes (22, 23, 24, etc.) are arranged in a ring, in the centre of which is the anode 21. Since the current bombarding the gas next to the cathode gives a neon-type "glow," the position of the count (number) is visually apparent at any instant.

Figure 3:
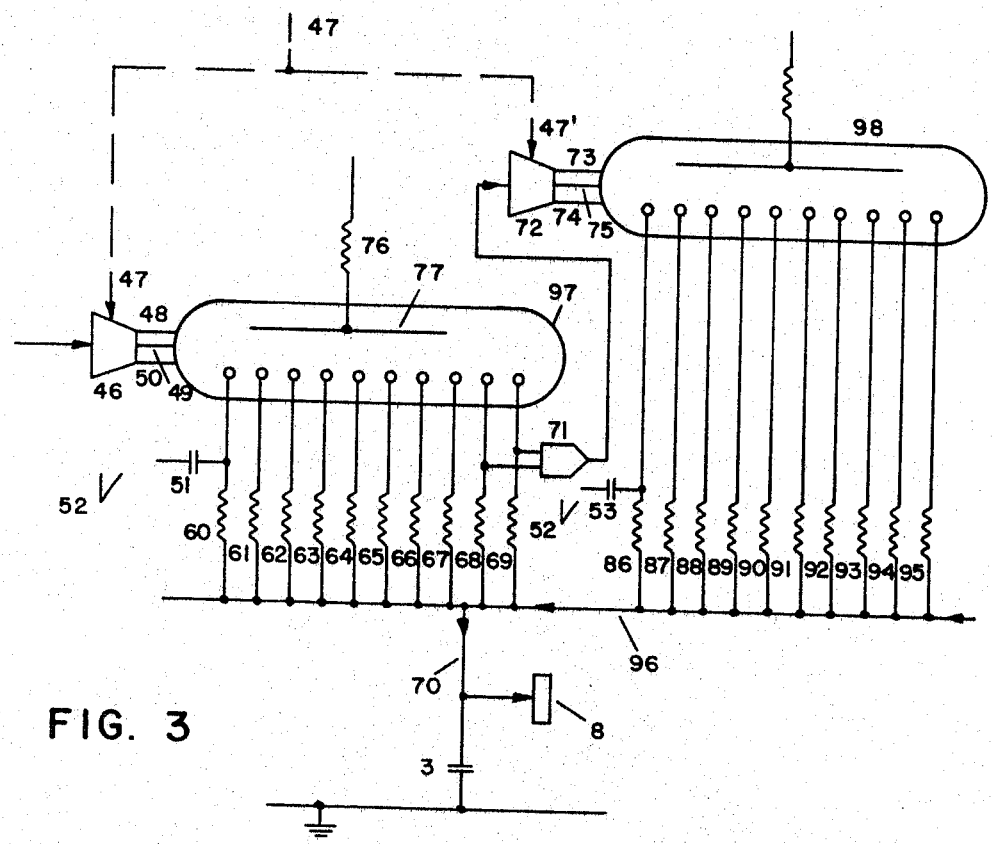
FIGURE 3 is a block circuit diagram, in which the counting device of FIGURE 2 is part of a counter, and shows how this counter relates to the pulse generator.

In FIGURE 3 there are shown two such decimal counting means, and how they are interconnected to form a counter. Moreover, their connections to the oscillator whose frequency varies as the counts are shown.

The action of this circuit is now described. Each trigger pulse into drive circuit 46 will cause the "glow" or current to move to a neighboring tube cathode, as made clear in FIGURE 2. A signal in line 47 controls contacts in all of the drives (46, 72, etc.), which connect the first pulse to either 47, 73, etc., or 48, 74, etc. That is, as described by FIGURE 2, the "glow" or count is made to progress one way or another around the cathode ring 1, these ways being termed "forward" (add, clockwise) or "reverse" (subtract, anticlockwise).

In the forward mode the "glow" will proceed from 58 to 59 cathodes, where 58 is read as "9" and 59 as "0." The positive voltage on 58 at count 9 will make the gate 71 ready for a positive voltage on 59. When this happens, there is a short pulse from this gate 71 which "triggers" drive circuit 72, and causes the "glow" in counting means 98 to advance one. Let this glow go from cathode "3" (78) to cathode "4" (79). Then it is evident that one pulse into 46 caused the "glows" or visual count to go from "39" to "40" (tube 98 counting tens and 97 units).

If initially the "glows" are on cathodes 59 and 79, and the control signal on 47 is for "reverse," then one pulse into 46 gives the count to go from "40" to "39." In this case the cathode 59 voltage prepares gate 71, so that, when the current is shifted to 58, gate 71 gives a trigger pulse out into 72. The "glow" in 98 then transfers (in reverse) onto cathode 78 (3 10).

The decimal counting tube 97 has resistors 60 to 69 in its ten cathodes of such values that the current given to common conductor 70 by each cathode are proportional to that cathode's "count." That is, for example, cathode 51 (count "2") gives twice the current that cathode 50 (count "1") does. In a similar fashion, cathode 76 (count "1" times ten) gives 10 times the current of cathode 50. All of this current is conducted via 70 to capacity 3 of the oscillator (8 etc.) as outlined in FIGURE 1. There may be more than two such decimal tubes in series as a counter, the current from the remainder entering on conductor 96.

It is then evident that the pulse repetition frequency of the oscillator 8 is in direct proportion to the sum of these currents; that is, in proportion to the count (total). These counter stages may be reset to "0" by the application of a very large negative-going pulse to the "0" cathodes. Such a pulse is shown at 52, coupled via capacitors 51 and 53 to "1" cathodes. This is equivalent to the pulse reset of all the "flip-flops" in the usual binary counter.

Figure 4:
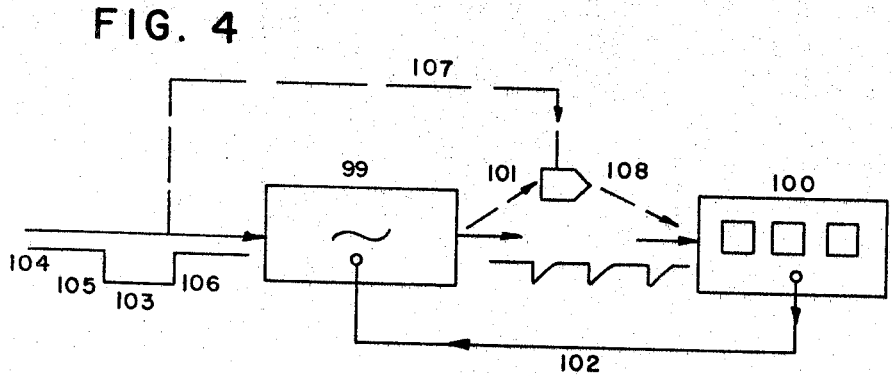
FIGURE 4 is a diagram illustrating in block form the useful relationship of the circuits of FIGURES 1, 2 and 3.

FIGURE 4 is a block diagram showing the relationship of the circuits of FIGURES 1, 2 and 3 as applied in this invention. The pulse oscillator whose rate is controlled by current is 99; the counter (say, three decimal stages) is 100.

The signal 103 into the oscillator controls the start and stop of the oscillator 99. At 105 the voltage goes negative with respect to 104, and the oscillator starts. At 106 the oscillator stops, i.e. the counting action stops.

The pulse rate 101 is determined by the current 102; that is, by the total in counter 100. As the total increases, the frequency increases; that is, the rate of change of the total increases along with the actual total.

By expressing this relation as a simple differential equation and solving, we get:

$$\log n = kt$$

The conversion to log (logarithm to base ten) from ln (log natural) is contained in the constant of proportion $k$. The circuit constants may be adjusted to make $k=1$ for reasonable units of $t$ (time); say, seconds.

It will be seen that the $t$ in the above equation is actually an interval of time, from 105 to 106. At the start of that interval, pulse rate and total are both zero. At the end of that time, pulse rate reverts to zero, while the log of the total represents that interval. Alternatively, we may state that:

$$n = k^1 \exp. t$$

where $t$ is the interval, and exp. represents exponential. ($k^1$ is not $k$, as it incorporates the log to log natural conversion.)

If the start and stop action of the counter be controlled by a series gate 108 in place of the clamp on the oscillator, then the same basic relationships apply. But in this case the frequency is not zero; it represents to some other scale an exponential of the time interval.

The total $n$ will remain in the counter until, upon command, it is reset to zero. In FIGURE 4 we may regard the input as a certain time interval $t$, and the output as the total $n$, being an exponential of that interval.

In FIGURE 5 there is shown a block diagram where the input is the digits of a number 111, and there are various outputs (115, 113, 121) which represent the log of that number.

The block 110 is a matching circuit which gives an electrical output when the digits at 109 equal those put in at 111. The input at 111 may be manual (digit selection by switches or pinboard) or electrical (one of a multiplicity of conductors in a set with a marking voltage, one set per digit). The coincidence is noted by the well-known method of pyramiding "and" diode gates.

At 114 there is a means for conversion of a time interval 115 to a voltage 113. This may be, for example, a fixed sawtooth of voltage which rises during the time interval $t$ of 115, and "holds" the end voltage at the end of this interval.

At 119 there is a pulse generator whose frequency is fixed with "on." This frequency $f_2$ is zero at times other than the interval $t$, which controls via 118. These pulses go via 120 to counter 121, which is similar to 100, except that it has no proportional current output.

The action is that the control circuit 116, upon being instructed to "start," permits pulse generators 99 and 119 to turn on, and voltage at 114 to increase. After an interval $t$, counter 100 will be at total N1, which matches the total $N1^1$ put in at 111. At this time a "stop" signal will be produced at 112 by the coincidence circuits 110.

This signal will cause control 116 to turn off generators 99, 119, and the sawtooth 114.

Then, for number $N1^1$, input at 111, the log N1 appears in three forms:
(1) Time interval $t$;
(2) Total N2 on counter 121;
(3) A voltage 113.

The total N2 is available both as a visual read-out and an electrical read-out. Having used or stored the output, the input 111 may then be changed, the counters 100 and 121 reset to zero, and a start instruction given to 116. For repeated cycling, a signal can be generated in 116 at fixed intervals to provide reset and start signals.

In FIGURE 6 there is shown the logical connection of elements to give a multiplication (or division) capability. The boxes are the same as those in FIGURE 5, except that the time-to-voltage unit 114 has been dropped, and reset and reverse controls added at 125 and 122.

Suppose that it is wished to multiply two numbers $N1^1$ and $N11^1$, the result to appear as a number N111 on the counter 100 at the end of the cycle. The steps involved are:

(1) The numbers are inserted in parallel on inputs 111 and 127, or in series on one of these inputs.

(2) The counters 100 and 121 having been reset to zero, a "start" signal is originated at 116, such that pulse generators 99 and 119 commence to feed into their respective counters 100 and 121. It is again noted that the pulse rate from 119 is fixed.

(3) After an interval $t$, the matching circuit 110 will have an output signal on line 112, meaning that the count in 100 equals $N1^1$. This signal will cause control 116 to turn off the pulse generators 99 and 119.

(4) The control 116 will then signal via line 124 to reset circuit 125 to reset counter 100, counter 121 remaining undisturbed.

(5) After a short time, control 116 will once again start generators 99 and 119. At the same time it will send a signal via 112 to matching circuit 110, so that that circuit now looks for a match to the second number $N11^1$.

(6) After a time a "match" to $N11^1$ will be signalled to control 116, causing a stop.

(7) Counter 100 is then reset, and an instrument is sent via 123 to reverse circuit 122, such that any further input pulses at 120 to counter 121 will subtract from the total in 121 (N2). When N2 reaches zero, this state is detected by diode gates (similar to the matching circuits).

(8) Control 116 now starts the generators (oscillators), and counter 100 adds exponentially as counter 121 subtracts.

(9) When counter 121 reaches zero, circuit 122 gives a signal to control 116 which stops the pulse generators.

(10) Then, since counter 121 contained a total which was proportional to the sum of the logarithms of $N1^1$ and $N11^1$, and this total became a time interval which was translated to an exponential in counter 100, then the number in counter 100 is N111 and is equal to the prouct of $N1^1$ and $N11^1$.

(11) Division is equivalent to the subtraction of two logarithms, so that for $N1^1$ divided by $N11^1$ it is only necessary to repeat steps 1–10, with counter 121 now being reversed at step 4 in place of step 7.

(12) A further multiplication or division operation can follow after counter 100 is reset. There is no limit to the number of factors that may be thus multiplied and divided, except that of the maximum frequency of 99 and/or the maximum count in 100 and 121. For a negative logarithm to be stored in counter 121, it is necessary to add an extra box to invert the result in counter 100.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only by the scope of the following claims.

What is claimed is:
1. A logarithmic computer, comprising
 (a) an electronic counter having an input and an output,
 (b) a resistive network connected to the output of said counter for converting the count in said counter into an analog signal in the form of current which is in direct proportion to said count,
 (c) a pulse generator connected to the output network of said counter and providing the sole input to said counter,
 (d) said pulse generator having a frequency output directly proportional to a current input,
 (e) said resistive network connected to said generator and providing a current input thereto,
 (f) the elapsed time for said counter to count from a first number to a second number is in logarithmic relation to said numbers.
2. A logarithmic computer, comprising
 (a) an electronic counter having an input and an output,
 (b) a network connected to the counter output and adapted to produce a first signal the magnitude of which varies directly with the count in said counter,
 (c) means providing an input signal constituting a second signal,
 (d) current matching means connected to said network and to said second signal means for comparing said first and second signals which are inputs thereto,
 (e) a current responsive pulse generator connected to said network whereby said first signal provides an input thereto,
 (f) said generator adapted to produce output pulses having a frequency directly related to said first signal,
 (g) a gate connected between said generator and said counter for passing said output pulses from said generator to said counter,
 (h) control means for first opening said gate to start said counter at the count of one and then closing said gate when said first signal equals said second signal whereby the elapsed time between opening and closing said gate is logarithmically related to said second signal.

3. A circuit for performing logarithmic operations such as multiplying and dividing on multiple input signals, comprising
(a) a first pulse generator having a frequency output directly proportional to a current input,
(b) a first gate in series with said first generator,
(c) a first counter in series with said first gate,
(d) a resistive network connected to the output of said first counter for converting the count in said counter into current in direct proportion to said count, said current forming an input to said first generator,
(e) control means for operating said first generator for input signal controlled intervals whereby the accumulated count in said first counter at the end of each interval will be an exponential of said interval,
(f) a second pulse generator having a fixed frequency adapted to be modified by integer ratios,
(g) a second gate in series with said second generator,
(h) a second counter which is reversible and in series with said second gate,
(i) matching means operatively connected to said first and second gates for first opening said gates whereby said second counter will add or subtract selectively for each interval, and,
(j) gating means having an input from said second counter for then closing said gates when said second counter is reversed and arrives at zero,
(k) said control means adapted to reset said first counter after each interval while said second counter accumulates the sum of the intervals.

4. A circuit for performing logarithmic operation such as multiplication and division on multiple input signals, comprising a first pulse generator having a current responsive frequency, a first gate in series with said first generator, a first counter, means for resetting said first counter, said first counter being in series with said first gate adapted to produce an output current directly proportional to the count therein, said output current providing a feedback to said first generator to control its frequency, said first generator having a pulse rate responsive to and directly proportional to said feedback current, control means connected to said generator for operating said generator for signal-controlled intervals whereby the accumulated count in said counter at the end of each interval will be an exponential of said interval, input means providing input signals to said control means, comparison means connected to the output current of said first counter and to said input means, said comparison means connected to said control means, a second pulse generator having a fixed frequency output, a second gate in series with said second generator, a second counter, means for running said second counter selectively forwards or backwards, said second counter being in series with said second gate, said control means being operatively connected to said first and second gates whereby both of said generators may be operated for time intervals according to said input signals determined by said comparison means comparing inputs to feedback from said first counter, each time interval representing a logarithmic result of a count in said first counter and said interval, whereby sequential intervals may be selectively added or subtracted in said second counter by said control means operating said second counter selectively forwards or backwards and resetting said first counter after each interval, said control means after the last interval corresponding to the last input signal for a selected calculation, adapted to reverse said second counter while said first and second gates are opened so that when the second counter reaches zero said control means will turn off said first and second gates whereby the sum of the logarithmic intervals in said second counter will appear as an exponential of this sum of intervals in said first counter.

References Cited

UNITED STATES PATENTS

| | | | |
|---|---|---|---|
| 2,905,895 | 9/1959 | Gordon | 324—79 |
| 2,926,848 | 3/1960 | Gordon | 235—164 |
| 2,927,271 | 3/1960 | Gordon | 324—78 |
| 2,951,202 | 8/1960 | Gordon | 324—79 |
| 2,951,986 | 9/1960 | Gordon | 324—79 |
| 3,095,522 | 6/1963 | Kitz et al. | 315—84.6 |
| 3,112,478 | 11/1963 | Ostroff | 340—347 |

MALCOLM A. MORRISON, *Primary Examiner.*

K. F. MILDE, *Assistant Examiner.*